Oct. 30, 1923.
S. ZUKOWSKI
1,472,711
SLED
Filed Feb. 10, 1923
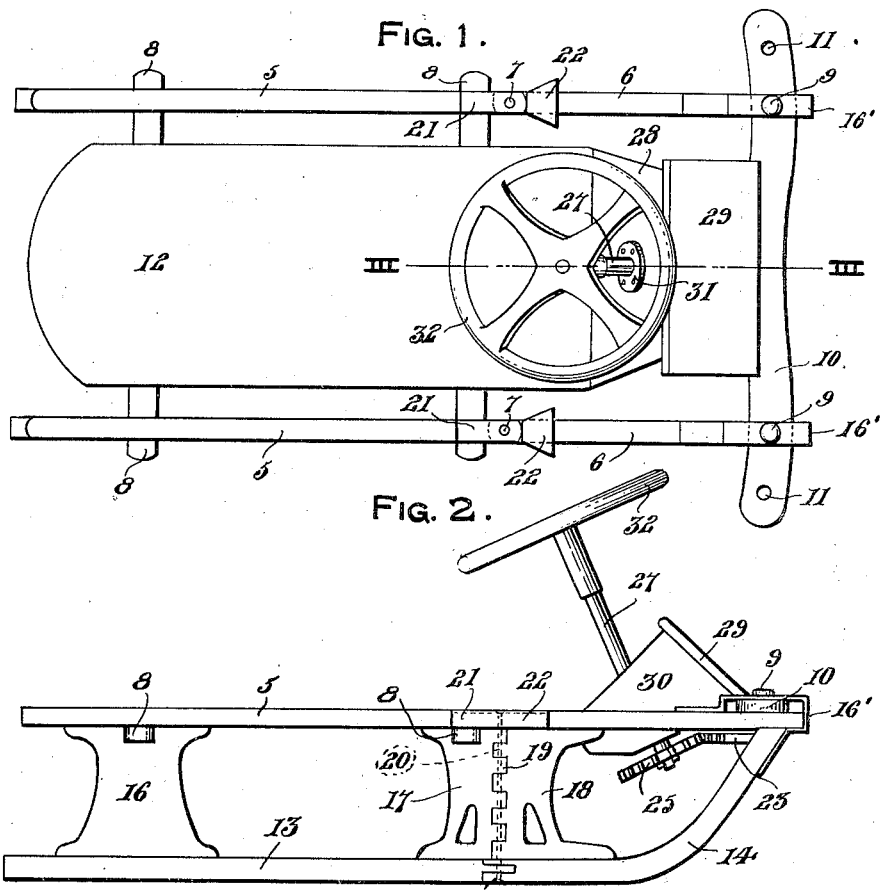
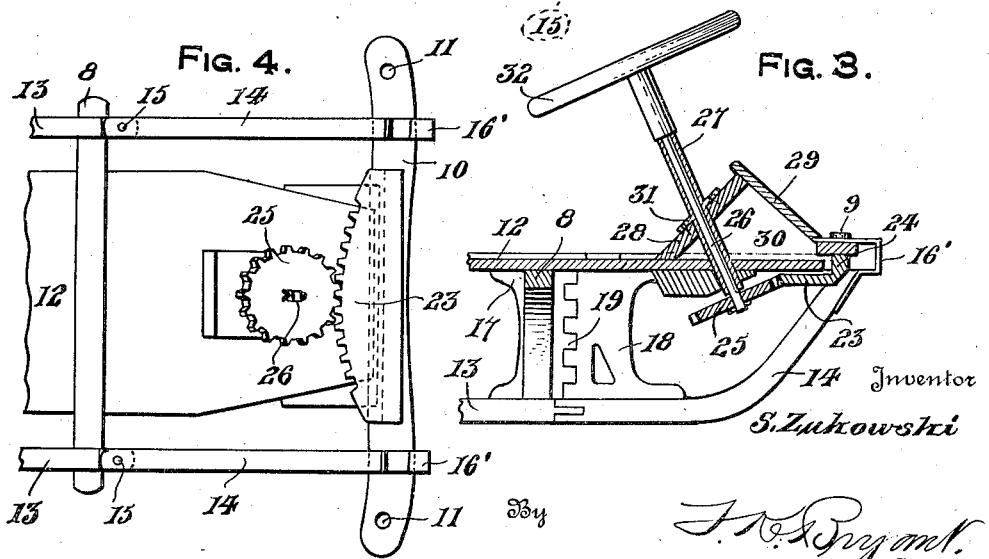
Inventor
S. Zukowski
By J. R. Bryant
Attorney Patented Oct. 30, 1923.

1,472,711

UNITED STATES PATENT OFFICE.

STEFAN ZUKOWSKI, OF PASCOAG, RHODE ISLAND, ASSIGNOR OF FORTY-FIVE PER CENT TO LUDWIK OKONIEWSKI, OF PASCOAG, RHODE ISLAND.

SLED.

Continuation of application Serial No. 538,198, filed February 21, 1922. This application filed February 10, 1923. Serial No. 618,317.

*To all whom it may concern:*

Be it known that I, STEFAN ZUKOWSKI, a citizen of Poland, residing at Pascoag, in the county of Providence and State of Rhode Island, have invented certain new and useful Improvements in Sleds, of which the following is a specification.

The present application is the continuation of the subject matter disclosed in my copending application on sleds, filed February 21, 1922, Serial No. 538,198.

The present invention relates to occupant-steered sleds and the primary object thereof is the provision of durable and efficient steering mechanism for the sleds of this type.

In the drawings:

Figure 1 is a top plan view of a sled constructed in accordance with the present invention, Figure 2 is a view in side elevation, Figure 3 is a central longitudinal sectional view taken upon line III—III of Fig. 1, and Figure 4 is a bottom plan view of the front portion of the device shown in Fig. 1.

Referring more in detail to the several views, the sled embodies longitudinal upper rails 5 having forward ends 6 pivoted as at 7 for horizontal swinging movement and having its rear section rigidly connected by means of cross bars 8 which are suitably secured to the under faces of the rails and project beyond the outer sides of the rails 5, and braces 16 and 17 are provided with notches to accommodate said cross bars. The forward ends of the hinged rail sections 6 are pivotally attached as at 9 to the end portions of a combined steering bar and foot rest 10 which has projecting ends provided with apertures 11 for attaching a rope for the purposes of pulling the sled. The cross bars 8 support a platform 12 which extends from the rear ends of side rails 5 to a point slightly rearwardly of the forward ends of the sections 6 and which lies under the steering bar 10 as clearly shown in Figs. 3 and 4.

A longitudinally disposed runner 13 is situated beneath each side rail 5, and each runner includes a forward section 14. The rear ends of said forward sections 14 are pivoted to the forward ends of said runners as at 15. Braces rigidly connect the rear ends of the runners 13 and side rails 5. A strip of sheet metal 16' by means of fastenings driven thereto connects the upturned ends of the forward runner sections 14 with the rail sections 6. Said sheet metal strip is suitably formed so as to permit the passage therebeneath of the steering bar 10 as clearly seen on Fig. 2.

The forward ends of the runners 13 and the forward ends of the rails 5 are rigidly connected by forward braces 17; while the rear ends of the forward sections 14 and the rear ends of the rail sections 6 are likewise rigidly connected by braces 18 of like construction. The forward ends of braces 17 and the rear ends of braces 18 are provided with a plurality of rigid extensions 19 arranged in staggered relations, and the extensions of the rear braces mesh or interlock with the extensions carried by the forward braces, and thus form hinges for the respective pairs of the braces. A pin 20 pivotally connects said braces 17 and 18 passing through their respective extensions. It will be seen that the same pin 20 pivotally connects side rails 5 with rail sections 6, and runners 13 with runner sections 14.

It will be seen that by means of the above-described arrangement the forward portion of the sled, including runner sections 14, rail sections 6 and braces 18, is adapted for horizontal swinging movement.

Any suitable form of journal members 21 formed of sheet metal are attached to the forward ends of the rails 5 and they include forwardly projecting flared portions 22 overlying the rear ends of the rails sections 6 so as to limit the horizontal swinging movement of the latter to either side and consequently also to impart said limitation of movement to the whole forward portion of the sled.

A segment gear 23 disposed in a horizontal position beneath the forward end of the platform 12 and having a rearwardly curved rear edge provided with teeth has an upstanding flange 24 upon its forward edge which is rigidly attached in any suitable manner to the under face of the steering bar 10 as clearly shown in Fig. 3. The teeth of the segment gear 23 mesh with the teeth of a third gear 25 which is suitably fixed upon the lower end of a steering post 26 located rearwardly of said segment gear 23 and journaled in a housing 27 which extends through an inclined opening in the platform 12.

The housing 27 also passes through an opening in the foot board 28 which is supported by the platform 12 and forwardly inclined cover board 29, said foot board and cover board being supported by and fastened to the upright side walls 30. The housing 27 carries a rigidly formed thereon collar 31 being set at an incline conforming to the incline of the foot board 28, and by means of said collar the housing 27 is rigidly mounted upon said foot board. The steering post 26 has a steering wheel 32 fastened upon its upper end whereby the gear 25 may be turned for shifting the segment gear 23 and the steering bar 10 laterally and in the desired direction so as to effect steering of the sled as is obvious. The rearward curvature of the toothed edge of the segment gear is required as the swinging movement of the runner sections bring the segment gear nearer to the third gear 25 and the same will be positioned when the runner sections 14 are positioned for travelling straight ahead.

While it is herein shown and described a preferred embodiment of the present invention, it is nevertheless to be understood that minor changes may be made without departing from the spirit and scope of the invention as claimed.

What is claimed as new is:—

1. In a sled of the type described having a rear portion, a forward portion of the sled pivoted to said rear portion, manually operable means to horizontally swing said forward portion of the sled, and means to limit the horizontal swinging movement of the forward portion of the sled, said last named means including journal members carried by said rear portion and overhanging the rear end of said forward portion.

2. In a sled of the type described, a rear portion of the sled including runners and side rails disposed thereabove, a forward portion of the sled including runner sections and rail sections disposed thereabove, said runner sections being pivoted to said runners, and said rail sections being pivoted to said side rails to adapt said forward portion of the sled for horizontal swinging movement, means to horizontally swing said forward portion of the sled, and means limiting the horizontal swinging movement of said forward portion of the sled in either direction, said last named means including journal members secured to the forward ends of said side rails having flared forward portions overhanging the rear ends of said rail sections.

In testimony whereof I affix my signature.

STEFAN ZUKOWSKI.